(12) United States Patent
Yoon

(10) Patent No.: US 6,431,639 B2
(45) Date of Patent: Aug. 13, 2002

(54) TRAVELING SAFETY DEVICE FOR MOTOR VEHICLE

(76) Inventor: Chul-Kyun Yoon, 28, Beopheung-ri, Suzu-myun, Youngwol-kun, Kangwon-do (KR)

( * ) Notice: Subject to any disclaimer, the term of this patent is extended or adjusted under 35 U.S.C. 154(b) by 0 days.

(21) Appl. No.: 09/863,949

(22) Filed: May 22, 2001

(30) Foreign Application Priority Data

Jun. 20, 2000 (KR) .............................. 00-33937

(51) Int. Cl.⁷ .............................. B62D 37/02
(52) U.S. Cl. ..................... 296/180.1; 296/180.5; 296/76
(58) Field of Search ............... 296/180.1, 180.5, 296/76; 180/903

(56) References Cited

U.S. PATENT DOCUMENTS

| | | | | |
|---|---|---|---|---|
| 4,274,670 A | * | 6/1981 | Pitzmann | 296/180.1 |
| 4,810,022 A | * | 3/1989 | Takagi et al. | 180/197 |
| 5,165,751 A | * | 11/1992 | Matsumoto et al. | 296/180.5 |
| 5,356,195 A | * | 10/1994 | Kanda | 296/146.8 |
| 5,415,453 A | * | 5/1995 | Huber | 15/250.16 |
| 5,454,619 A | * | 10/1995 | Haraway, Jr. | 180/903 |
| 5,544,931 A | * | 8/1996 | Nelson | 296/180.1 |
| 5,934,740 A | * | 8/1999 | Moebius et al. | 296/180.1 |
| 2002/0021022 A1 | * | 2/2002 | Erdelitsch et al. | 296/180.1 |

FOREIGN PATENT DOCUMENTS

| | | | | |
|---|---|---|---|---|
| DE | 3512378 A1 | * | 10/1985 | 296/108.5 |
| FR | 2506247 | * | 11/1982 | 296/180.1 |
| JP | 5-185963 A | * | 7/1993 | 296/180.5 |

* cited by examiner

*Primary Examiner*—Joseph D. Pape
*Assistant Examiner*—Patricia Engle

(57) ABSTRACT

Disclosed is a spoiler which constitutes a traveling safety device for a motor vehicle. The spoiler is adapted for controllably diverting airflow which passes over aerodynamic surfaces of a motor vehicle, upon high speed traveling of the motor vehicle. The spoiler comprises a supporting section arranged between a rear windshield glass and a trunk door and defined with a receiving groove in a manner such that a front end portion of the trunk door is inserted into the receiving groove, with a rubber packing fitted into the receiving groove, the supporting section being fastened to the front end portion of the trunk door by fastening means; and an airflow controlling section arranged in such a way as to define a predetermined inclination angle with respect to the supporting section, the airflow controlling section functioning to control the airflow which passes over the aerodynamic surfaces of the motor vehicle and thereby forcibly depress downward a rear part of the motor vehicle so that the rear part of the motor vehicle is prevented from being aerodynamically jolted or lifted.

4 Claims, 13 Drawing Sheets

Prior Art

Prior Art

TRAVELING SAFETY DEVICE FOR MOTOR VEHICLE

BACKGROUND OF THE INVENTION

1. Field of the Invention

The present invention relates to a technique for mounting a spoiler to a trunk door of a motor vehicle, and more particularly, the present invention relates to a traveling safety device for a motor vehicle, which effectively prevents a rear part of the motor vehicle from being jolted or lifted upon high speed traveling, abrupt stopping, or cornering of the motor vehicle, specifically, a compact car.

2. Description of the Related Art

Generally, in a motor vehicle, an engine room is defined at a front part. Therefore, the front part of the motor vehicle is weighty, and a rear part of the motor vehicle is light.

Upon high speed traveling, abrupt stopping, or cornering of a motor vehicle, airflow which passes over surfaces of the motor vehicle, should be properly controlled to improve tire traction and directional stability. In this regard, in the conventional art, in order to control the airflow, the surfaces of a body of the motor vehicle over which surfaces the airflow passes, are aerodynamically designed, and, as auxiliary means, a spoiler is mounted to a rear end of a trunk door of the motor vehicle.

That is to say, as shown in FIG. 1, due to the fact that a spoiler 2 is mounted to a rear end of a trunk door 1 of a motor vehicle so as to divert and thereby control airflow which passes over aerodynamic surfaces of the motor vehicle, tire traction and directional stability is improved.

However, although the conventional spoiler controls the airflow, it is encountered with a problem in that, since it only functions to divide the airflow which passes over the aerodynamic surfaces of the motor vehicle, as the airflow masses at a rear part of the motor vehicle upon high speed traveling or abrupt stopping, the rear part of the motor vehicle which rear part is relatively light in comparison with a front part of the motor vehicle in which front part an engine room is defined, is likely to be aerodynamically jolted or lifted.

In other words, when observing the motor vehicle in view of the center of gravity, because the rear part in which a trunk room is defined, is more light than the front part in which the engine room is defined, when the motor vehicle, specifically, a compact car travels at a high speed or abruptly stops, the rear part of the motor vehicle can be jolted or lifted by the airflow passing over the aerodynamic surfaces of the motor vehicle, whereby tire traction and directional stability of the motor vehicle cannot but be deteriorated.

Moreover, as schematically shown in FIG. 2, in the case that the motor vehicle rounds a sharp curve while traveling at a high speed, left wheels are lifted and thereby the body of the motor vehicle is inclined downward in a rightward direction. At this time, due to this cornering of the motor vehicle, strong airflow is developed on the aerodynamic surfaces of a left part B of the motor vehicle, whereas smooth airflow is developed on the aerodynamic surfaces of a right part A of the motor vehicle.

Therefore, in the conventional art, when the motor vehicle corners, the likelihood of a left portion of the rear part of the motor vehicle which rear part is relatively light in comparison with the front part of the motor vehicle in which front part the engine room is defined, to be jolted or lifted due to the presence of the strong airflow, is increased, and, thereby, safe driving of the motor vehicle can be adversely affected.

SUMMARY OF THE INVENTION

Accordingly, the present invention has been made in an effort to solve the problems occurring in the related art, and an object of the present invention is to provide a traveling safety device for a motor vehicle, wherein one or more spoilers are disposed between a rear windshield glass and a front end of a trunk door in a manner such that operations of the spoilers can be selectively controlled by signals which are produced by sensing a speed of the motor vehicle through a speedometer, measuring a difference in wind velocity between both sides of a body of the motor vehicle and/or grasping operational statuses of left and right shock absorbers positioned in a rear part of the motor vehicle, upon high speed traveling, abrupt stopping, or cornering of the motor vehicle, and thereby, an end portion or both end portions of the rear part of the motor vehicle can be depressed downward due to collision of airflow which passes over aerodynamic surfaces of the motor vehicle, with the spoilers, whereby the rear part of the motor vehicle is effectively prevented from being jolted or lifted upon high speed traveling, abrupt stopping, or cornering of the motor vehicle.

In order to achieve the above object, according to the present invention, there is provided a spoiler adapted for controllably diverting airflow which passes over aerodynamic surfaces of a motor vehicle, upon high speed traveling of the motor vehicle, the spoiler comprising: a supporting section arranged between a rear windshield glass and a trunk door and defined with a receiving groove in a manner such that a front end portion of the trunk door is inserted into the receiving groove, with a rubber packing fitted into the receiving groove, the supporting section being fastened to the front end portion of the trunk door by fastening means; and an airflow controlling section arranged in such a way as to define a predetermined inclination angle with respect to the supporting section, the airflow controlling section functioning to control the airflow which passes over the aerodynamic surfaces of the motor vehicle and thereby forcibly depress downward a rear part of the motor vehicle so that the rear part of the motor vehicle is prevented from being aerodynamically jolted or lifted.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
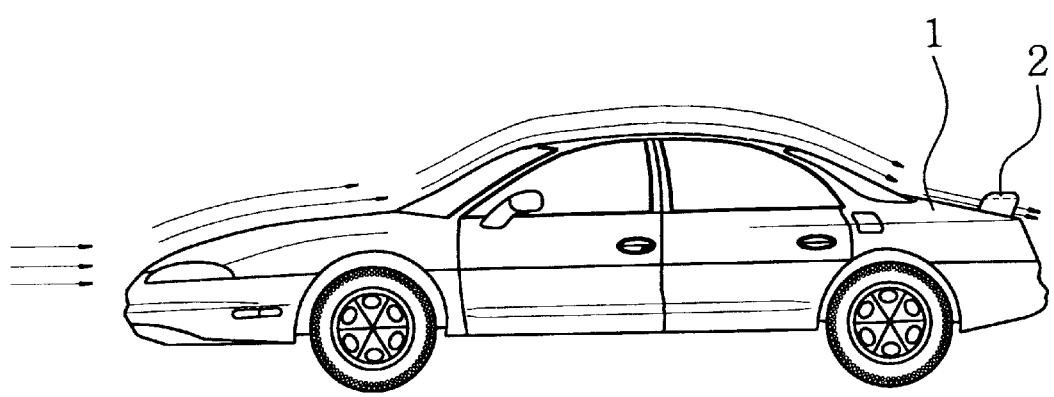
FIG. 1 is a side view illustrating a state wherein airflow passing over aerodynamic surfaces of a motor vehicle is controlled by a conventional spoiler which is mounted to a rear end of a trunk door.
Figure 2:
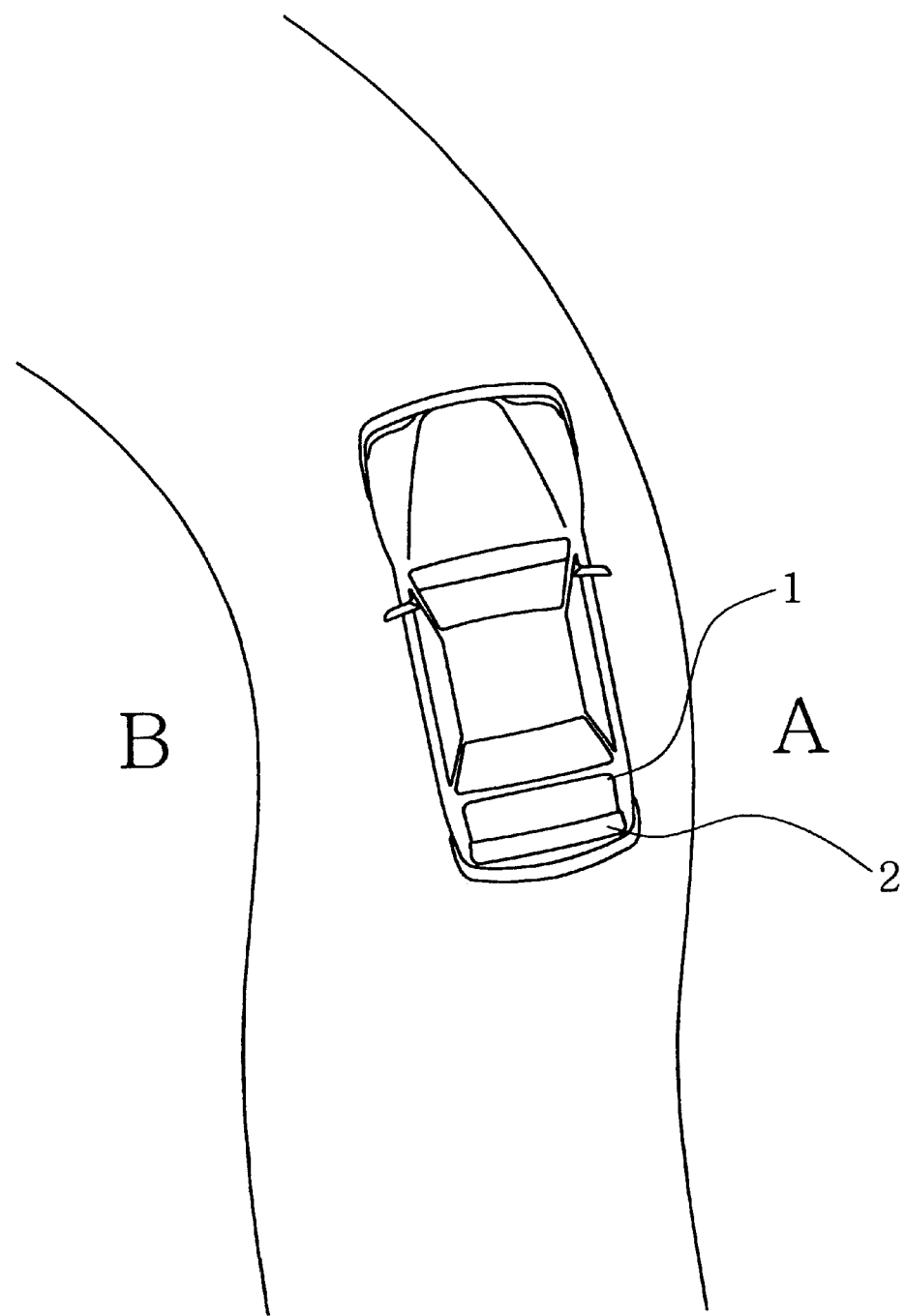
FIG. 2 is a plan view illustrating a motor vehicle which is cornering.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
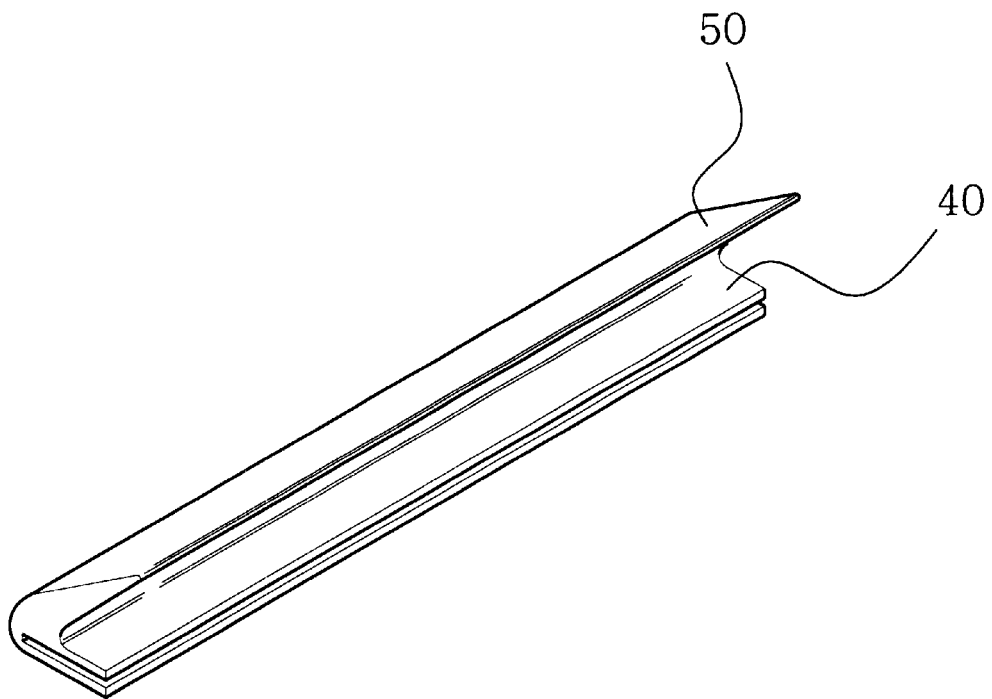
FIG. 3 is a perspective view illustrating a construction of a spoiler which is mounted to a front end portion of a trunk door of a motor vehicle, in accordance with a first embodiment of the present invention.
Figure 4:
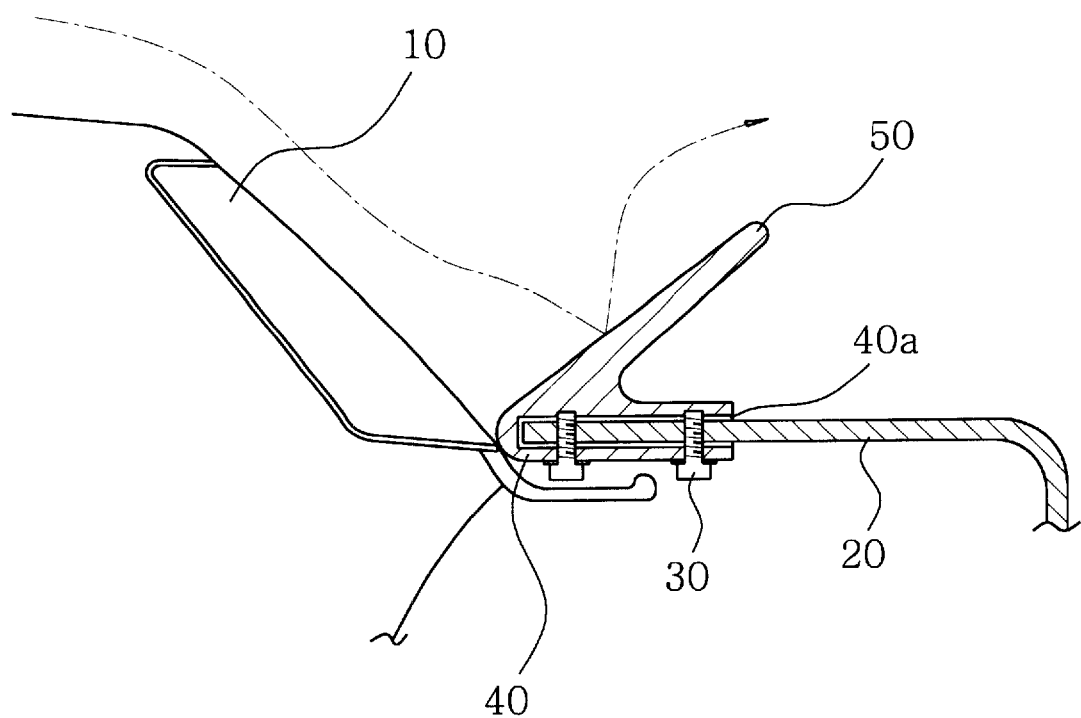
FIG. 4 is a cross-sectional view illustrating a state wherein the spoiler according to the first embodiment of the present invention is mounted to the front end portion of the trunk door of the motor vehicle.
Figure 5:
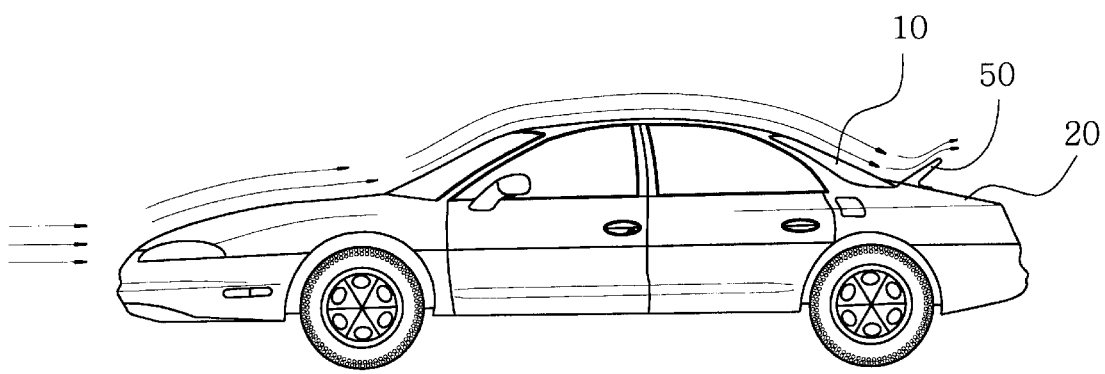
FIG. 5 is a side view illustrating a state wherein airflow passing over aerodynamic surfaces of the motor vehicle is controlled by the spoiler according to the first embodiment of the present invention which spoiler is mounted to the front end portion of the trunk door of the motor vehicle.
Figure 6:
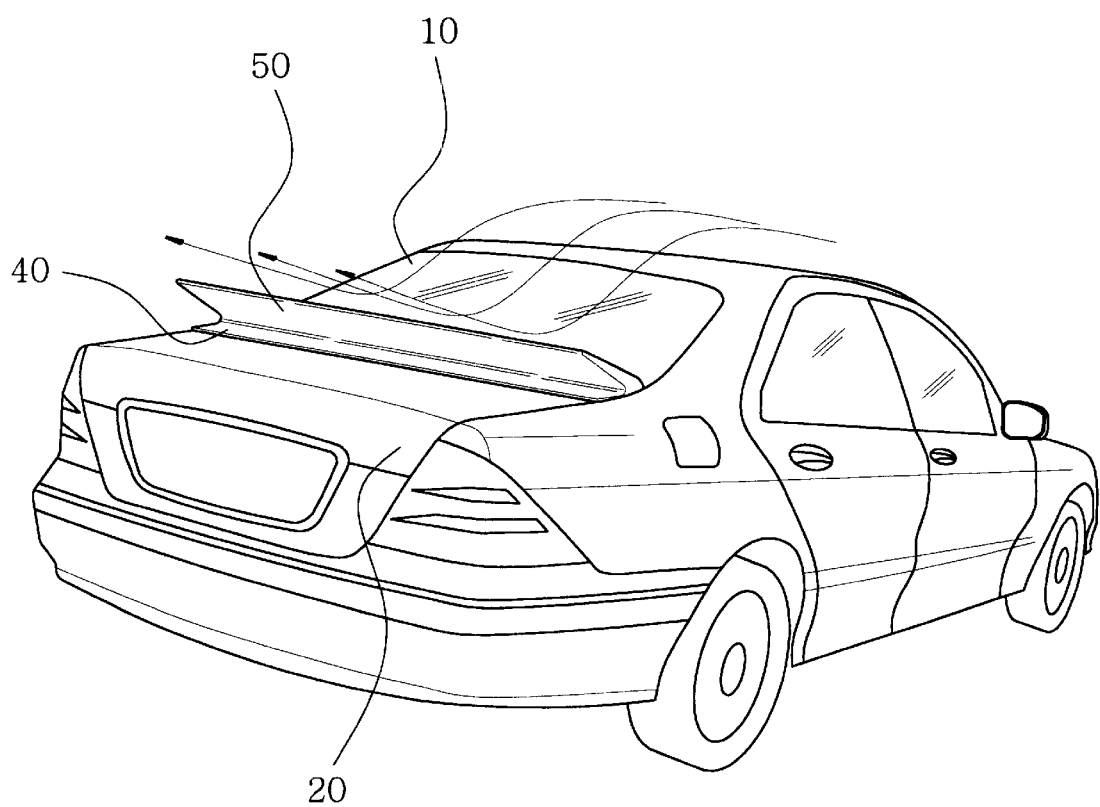
FIG. 6 is a perspective view illustrating the state wherein airflow passing over aerodynamic surfaces of the motor vehicle is controlled by the spoiler according to the first embodiment of the present invention which spoiler is mounted to the front end portion of the trunk door of the motor vehicle.

FIG. 3 is a perspective view illustrating a construction of a spoiler which is mounted to a front end portion of a trunk door of a motor vehicle, in accordance with a first embodiment of the present invention; FIG. 4 is a cross-sectional view illustrating a state wherein the spoiler according to the first embodiment of the present invention is mounted to the front end portion of the trunk door of the motor vehicle; FIG. 5 is a side view illustrating a state wherein airflow passing over aerodynamic surfaces of the motor vehicle is controlled by the spoiler according to the first embodiment of the present invention which spoiler is mounted to the front end portion of the trunk door of the motor vehicle; and FIG. 6 is a perspective view illustrating the state wherein airflow passing over aerodynamic surfaces of the motor vehicle is controlled by the spoiler according to the first embodiment of the present invention which spoiler is mounted to the front end portion of the trunk door of the motor vehicle.

As shown in FIGS. 3 through 6, a spoiler according to this first embodiment of the present invention is adapted for controllably diverting airflow which passes over aerodynamic surfaces of a motor vehicle, upon high speed traveling of the motor vehicle. The spoiler includes a supporting section 40 and an airflow controlling section 50. The supporting section 40 is arranged between a rear windshield glass 10 and a trunk door 20. The supporting section 40 is defined with a receiving groove in a manner such that a front end portion of the trunk door 20 is inserted into the receiving groove, with a rubber packing 40a fitted into the receiving groove. The supporting section 40 is fastened to the front end portion of the trunk door 20 by fastening means 30 such as bolts. The airflow controlling section 50 is arranged in such a way as to define a predetermined inclination angle with respect to the supporting section 40. The airflow controlling section 50 functions to control the airflow which passes over the aerodynamic surfaces of the motor vehicle and thereby forcibly depress downward a rear part of the motor vehicle so that the rear part of the motor vehicle is prevented from being aerodynamically jolted or lifted.

Hereinafter, workings of the spoiler in accordance with the first embodiment of the present invention, constructed as mentioned above, will be described in detail with reference to FIGS. 3 through 6.

First, the front end portion of the trunk door 20 of the motor vehicle is inserted into the receiving groove which is defined in the supporting section 40 in a state wherein the rubber packing 40a is already fitted into the receiving groove. Then, by screwing the bolts 30 from a lower surface of the supporting section 40, mounting of the supporting section 40 and the airflow controlling section 50 which are integrally formed with each other, between the rear windshield glass 10 and the trunk door 20, is completed.

Thereafter, if the motor vehicle travels at a high speed, as can be readily seen from FIGS. 5 and 6, as the airflow which passes over the aerodynamic surfaces of a body of the motor vehicle, including the rear windshield glass 10, collides with the airflow controlling section 50 which is integrally formed with the supporting section 40, the airflow is diverted upward in the form of a parabola.

At this time, when the airflow which passes over the rear windshield glass 10, collides with the airflow controlling section 50, a pressure which is applied to the airflow controlling section 50, is considerably increased. As a consequence, by virtue of the pressure which is applied to the airflow controlling section 50, the rear part of the motor vehicle is prevented from being aerodynamically jolted or lifted due to high speed traveling of the motor vehicle, whereby tire traction and directional stability of the motor vehicle can be markedly improved.

Figure 7:
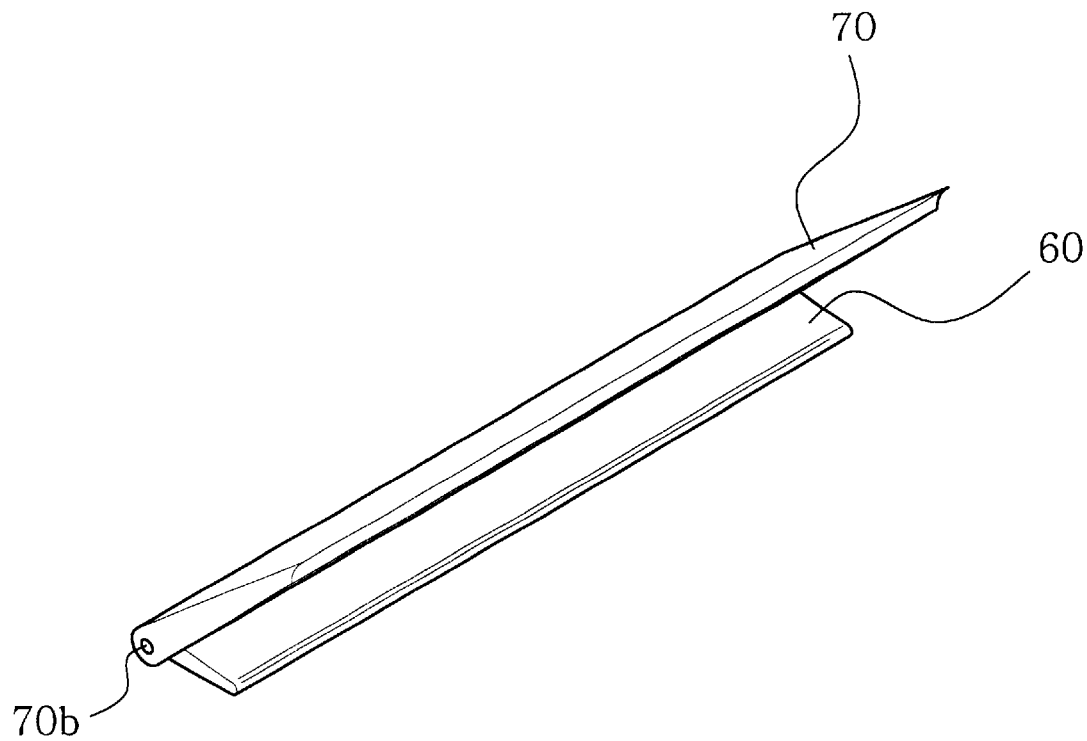
FIG. 7 is a perspective view illustrating a construction of a spoiler which is mounted to a front end portion of a trunk door of a motor vehicle, in accordance with a second embodiment of the present invention.
Figure 8:
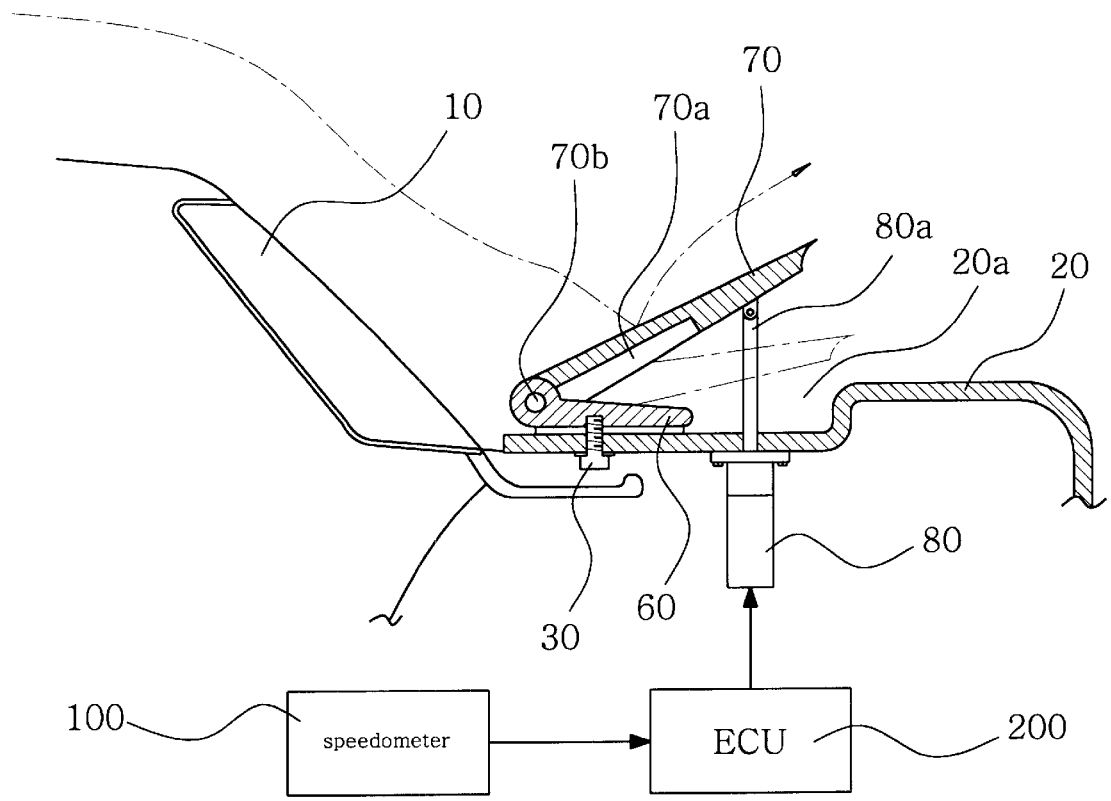
FIG. 8 is a cross-sectional view illustrating a state wherein the spoiler according to the second embodiment of the present invention is mounted to the front end portion of the trunk door of the motor vehicle.

On the other hand, referring to FIGS. 7 and 8, there is shown a second embodiment of the present invention, in which a spoiler is automatically deployed in response to a traveling speed of a motor vehicle. FIG. 7 is a perspective view illustrating a construction of a spoiler which is mounted to a front end portion of a trunk door of a motor vehicle, in accordance with the second embodiment of the present invention; and FIG. 8 is a cross-sectional view illustrating a state wherein the spoiler according to the second embodiment of the present invention is mounted to the front end portion of the trunk door of the motor vehicle.

In FIGS. 7 and 8, like reference numerals are used to denote the same component elements as in the first embodiment depicted in FIGS. 3 through 6.

As shown in FIGS. 7 and 8, a spoiler according to this second embodiment of the present invention includes a supporting section 60, an airflow controlling section 70 and a hydraulic cylinder 80. The supporting section 60 is arranged in a recess 20a which is defined on a front end portion of a trunk door 20. The supporting section 60 is fastened to the front end portion of the trunk door 20 by fastening means 30. The airflow controlling section 70 is connected to the supporting section 60 by a hinge shaft 70b and is defined, adjacent to a proximal end thereof, with a supporting section accommodating groove 70a in which the supporting section 60 can be accommodated. The airflow controlling section 70 is pivoted to a desired inclination angle with respect to the supporting section 60, in conformity with a traveling speed of the motor vehicle which is sensed by a speedometer 100 and functions to thereby control the airflow which passes over aerodynamic surfaces of the motor vehicle so that a rear part of the motor vehicle is prevented from being aerodynamically jolted or lifted. The hydraulic cylinder 80 has a piston 80a one end of which is secured to a lower surface of the airflow controlling section 70 adjacent to a distal end of the airflow controlling section 70. The hydraulic cylinder 80 functions, under control by an electronic control unit (ECU) 200 and depending upon the traveling speed of the motor vehicle, to linearly reciprocate the piston 80a in upward and downward directions in a manner such that the piston 80a pivots the airflow controlling section 70 to the desired inclination angle.

Hereinbelow, workings of the spoiler in accordance with the second embodiment of the present invention, constructed as mentioned above, will be described in detail with reference to FIGS. 7 and 8.

First, after the recess 20a is defined on the front end portion of the trunk door 20 of the motor vehicle, the supporting section 60 is arranged in the recess 20a and is fastened to the front end portion of the trunk door 20 by fastening means 30.

Then, after the airflow controlling section 70 which is defined, on the lower surface thereof adjacent to the proximal end thereof, with the supporting section accommodating groove 70a, is connected to the supporting section 60 by the hinge shaft 70b, the airflow controlling section 70 is pivoted into the recess 20a in a manner such that an upper surface of the airflow controlling section 70 is flushed with an upper surface of the trunk door 20.

At this time, the hydraulic cylinder 80 which is controlled by the ECU 200, is mounted to a lower surface of the trunk door 20, and one end of the piston 80a of the hydraulic cylinder 80 is secured to the lower surface of the airflow controlling section 70 adjacent to the distal end of the airflow controlling section 70.

Thereafter, if the motor vehicle travels, a traveling speed of the motor vehicle is sensed by the speedometer 100, and the sensed traveling speed of the motor vehicle is inputted into the ECU 200.

Accordingly, the ECU 200 controls an operation of the hydraulic cylinder 80, depending upon the traveling speed of the motor vehicle which is sensed by the speedometer 100. Under control by the ECU 200, the hydraulic cylinder 80 linearly reciprocates the piston 80a in the upward and downward directions in a manner such that the piston 80a pivots the airflow controlling section 70 to the desired inclination angle.

In other words, in the case that the motor vehicle travels at a low speed, the ECU 200 linearly moves upward the piston 80a of the hydraulic cylinder 80 by a short vertical distance, so that the airflow controlling section 70 which is connected to the supporting section 60 by the hinge shaft 70b, is deployed within a small inclination angle. On the contrary, in the case that the motor vehicle travels at a high speed, the ECU 200 linearly moves upward the piston 80a of the hydraulic cylinder 80 by a long vertical distance, so that the airflow controlling section 70 is deployed up to a large inclination angle.

At this time, when the airflow which passes over the aerodynamic surfaces of a body of the motor vehicle, including the rear windshield glass 10, collides with the airflow controlling section 70, a pressure which is applied to the airflow controlling section 70, varies depending upon an inclination angle which is defined by the deployment of the airflow controlling section 70. As a consequence, by virtue of the pressure which is applied to the airflow controlling section 70 by the airflow, the rear part of the motor vehicle is prevented from being aerodynamically jolted or lifted due to high speed traveling of the motor vehicle, whereby tire traction and directional stability of the motor vehicle can be markedly improved.

Namely, if a deployment angle of the airflow controlling section 70 is small, an airflow pressure is decreased, and, if a deployment angle of the airflow controlling section 70 is large, as an airflow pressure is increased, the rear part of the motor vehicle is effectively prevented from being aerodynamically jolted or lifted.

In the meanwhile, referring to FIGS. 9 through 12, there is shown a third embodiment of the present invention, in which a plurality of spoilers are automatically deployed upon high speed traveling, abrupt stopping or cornering of a motor vehicle.

Figure 9:
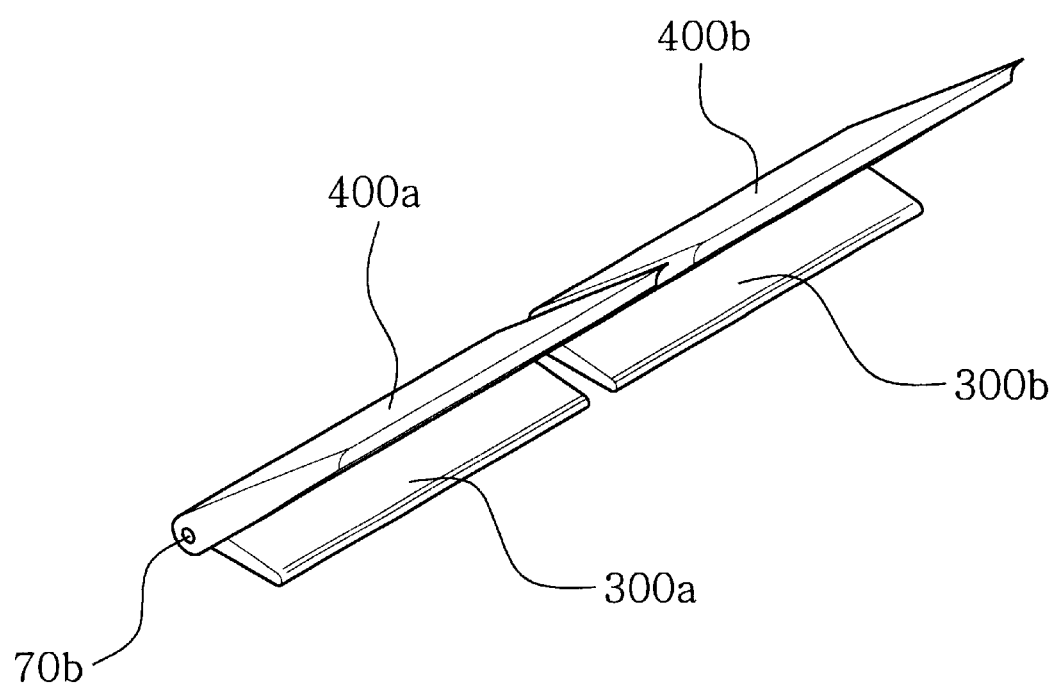
FIG. 9 is a perspective view illustrating a combined construction of a plurality of spoilers which are mounted to a front end portion of a trunk door of a motor vehicle, in accordance with a third embodiment of the present invention.
Figure 10:
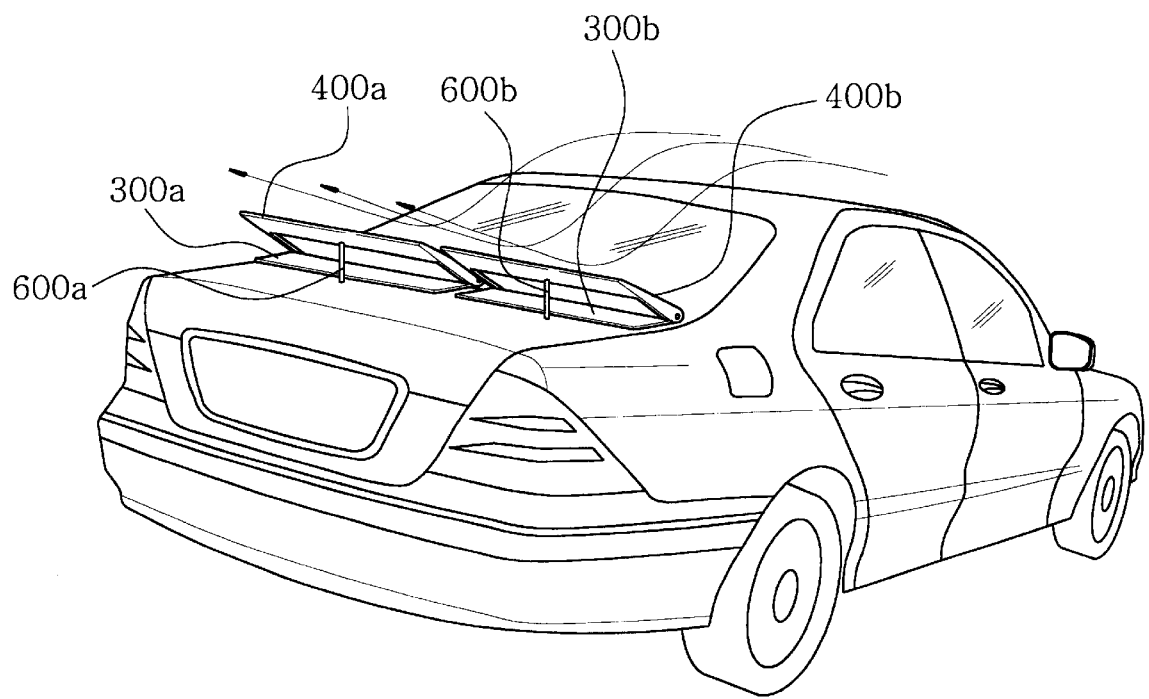
FIG. 10 is a perspective view illustrating a state wherein the plurality of spoilers according to the third embodiment of the present invention are mounted to the front end portion of the trunk door of the motor vehicle.
Figure 11:
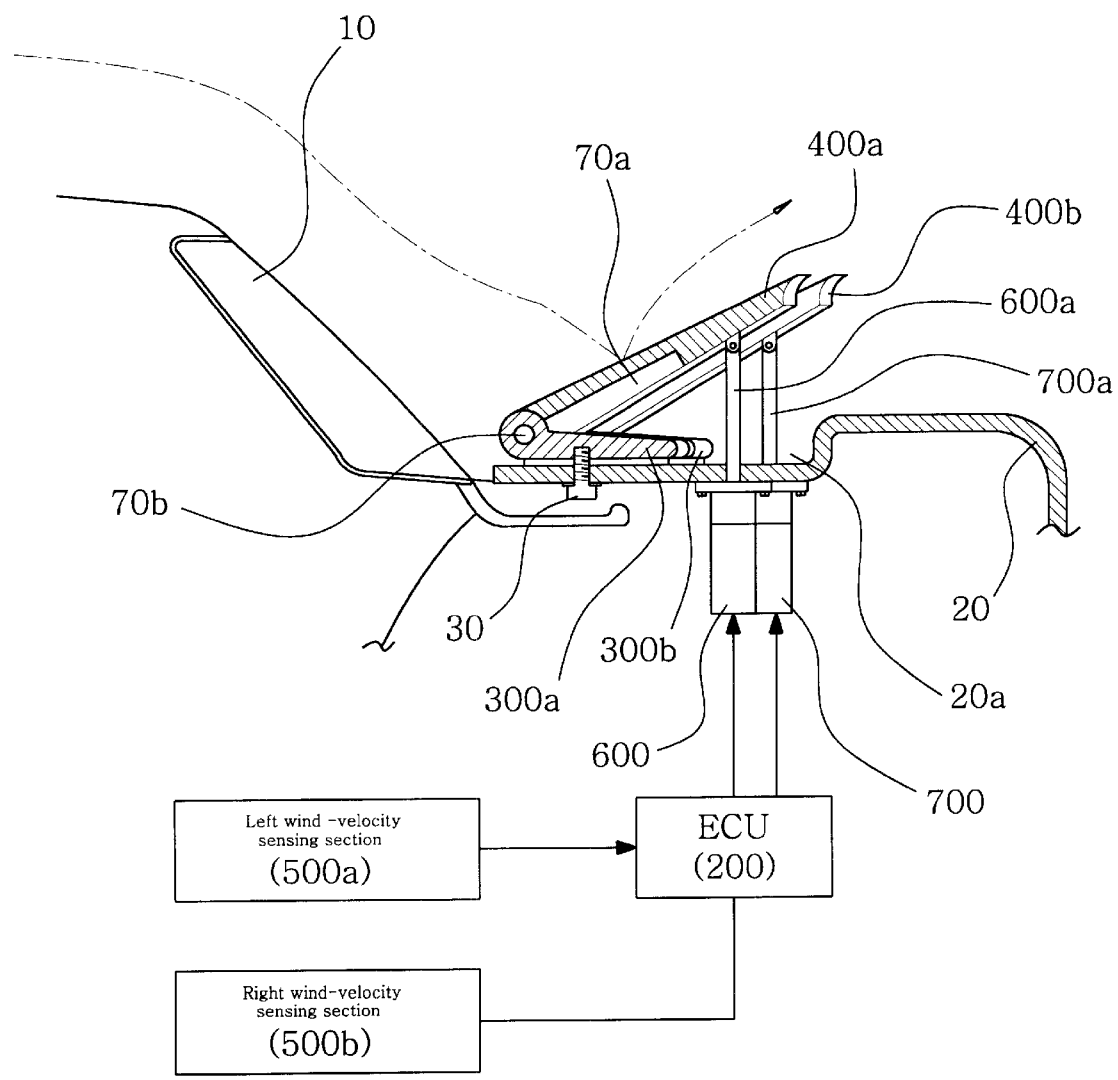
FIG. 11 is a cross-sectional view illustrating the state wherein the plurality of spoilers according to the third embodiment of the present invention are mounted to the front end portion of the trunk door of the motor vehicle.
Figure 12:
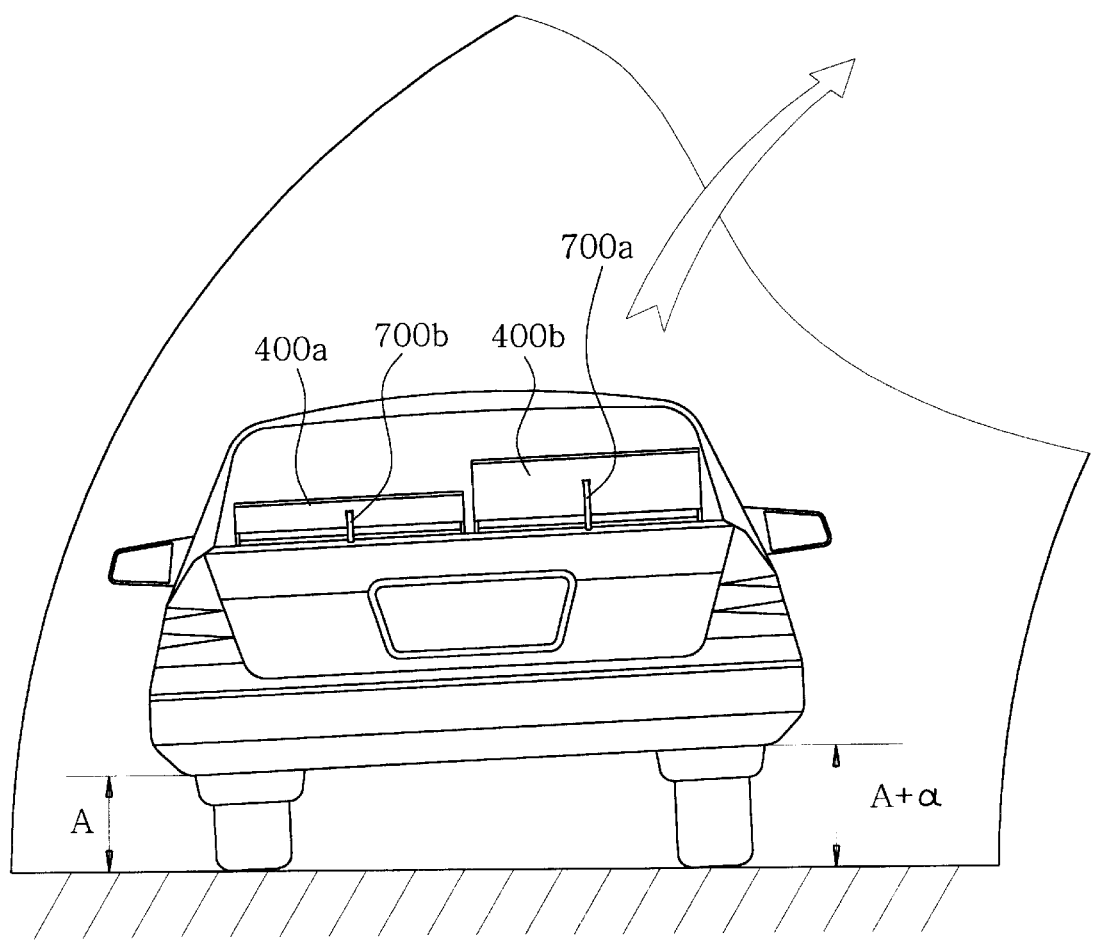
FIG. 12 is a rear view illustrating a state wherein, upon cornering of the motor vehicle, airflow passing over aerodynamic surfaces of the motor vehicle is controlled by selective deployment of at least one of the spoilers according to the third embodiment of the present invention.

FIG. 9 is a perspective view illustrating a combined construction of a plurality of spoilers which are mounted to a front end portion of a trunk door of a motor vehicle, in accordance with a third embodiment of the present invention; FIG. 10 is a perspective view illustrating a state wherein the plurality of spoilers according to the third embodiment of the present invention are mounted to the front end portion of the trunk door of the motor vehicle; FIG. 11 is a cross-sectional view illustrating the state wherein the plurality of spoilers according to the third embodiment of the present invention are mounted to the front end portion of the trunk door of the motor vehicle; and FIG. 12 is a rear view illustrating a state wherein, upon cornering of the motor vehicle, airflow passing over aerodynamic surfaces of the motor vehicle is controlled by selective deployment of at least one of the spoilers according to the third embodiment of the present invention.

As shown in FIGS. 9 through 12, a spoiler according to this third embodiment of the present invention is adapted for controllably diverting airflow which passes over aerodynamic surfaces of a motor vehicle, upon traveling of the motor vehicle. The spoiler includes first and second supporting sections 300a and 300b, first and second airflow controlling sections 400a and 400b, left and right wind-velocity sensing sections 500a and 500b, and first and second hydraulic cylinders 600 and 700. The first and second supporting sections 300a and 300b are respectively arranged in recesses 20a which are defined on a front end portion of a trunk door 20. The first and second supporting sections 300a and 300b are fastened to the front end portion of the trunk door 20 by fastening means 30. The first and second airflow controlling sections 400a and 400b are connected to the first and second supporting sections 300a and 300b by hinge shafts 70b, respectively, and are defined, adjacent to proximal ends thereof, with supporting section accommodating grooves 70a, respectively, in which the first and second supporting sections 300a and 300b can be accommodated. The first and second airflow controlling sections 400a and 400b are pivoted to desired inclination angles with respect to the first and second supporting sections 300a and 300b, respectively, upon high speed traveling, abrupt stopping or cornering of the motor vehicle. The first and second airflow controlling sections 400a and 400b function to control the airflow which passes over the aerodynamic surfaces of the motor vehicle so that a left or right portion or both left and right portions of a rear part of the motor vehicle are prevented from being aerodynamically jolted or lifted. The left and right wind-velocity sensing sections 500a and 500b are formed at both sides of the rear part of the motor vehicle, respectively. The left and right wind-velocity sensing sections 500a and 500b function to sense wind velocities on the both sides of the rear part of the motor vehicle upon high speed traveling, abrupt stopping or cornering of the motor vehicle and to output sensed information to an ECU 200. The first and second hydraulic cylinders 600 and 700 have first and second pistons 600a and 700a which are respectively connected to the first and second airflow controlling sections 400a and 400b. The first and second hydraulic cylinders 600 and 700 function, under control by the ECU 200 and depending upon wind-velocity changes which are sensed by the left and right wind-velocity sensing sections 500a and 500b, to linearly reciprocate the first and second pistons 600a and 700a and thereby pivot the first and second airflow controlling sections 400a and 400b to the desired inclination angles, respectively.

In FIGS. 9 through 12, like reference numerals are used to denote the same component elements as in the second embodiment depicted in FIGS. 7 and 8.

Hereinafter, workings of the spoiler in accordance with the third embodiment of the present invention, constructed as mentioned above, will be described in detail with reference to FIGS. 9 through 12.

First, after the recesses 20a are defined on the front end portion of the trunk door 20, the first and second supporting sections 300a and 300b are arranged in the recesses 20a and then, are fastened to the front end portion of the trunk door 20 by the fastening means 30.

Thereupon, after the first and second airflow controlling sections 400a and 400b which are respectively defined, on the lower surface thereof adjacent to the proximal ends thereof, with the supporting section accommodating grooves 70a, are connected to the first and second supporting sections 300a and 300b by the hinge shafts 70b, respectively, the first and second airflow controlling sections 400a and 400b are pivoted into the recesses 20a in a manner such that upper surfaces of the first and second airflow controlling sections 400a and 400b are flushed with an upper surface of the trunk door 20.

At this time, the first and second hydraulic cylinders 600 and 700 which are controlled by the ECU 200, are mounted to a lower surface of the trunk door 20, and one ends of the first and second pistons 600a and 700a of the first and second hydraulic cylinders 600 and 700 are secured to the lower surface of the first and second airflow controlling sections 400a and 400b, respectively, adjacent to the distal ends of the first and second airflow controlling sections 400a and 400b.

Thereafter, if the motor vehicle travels at a high speed, changes in wind-velocity at both sides of a body of the motor vehicle, are sensed by the left and right wind-velocity sensing sections 500a and 500b which are formed at the both sides of the rear part of the motor vehicle. The changes in wind-velocity which are sensed by the left and right wind-velocity sensing sections 500a and 500b, are inputted into the ECU 200.

At this time, the ECU 200 compares with each other and analyses the wind-velocity changes on the both sides of the body of the motor vehicle, which are sensed by the left and right wind-velocity sensing sections 500a and 500b, and then controls operations of the first and second hydraulic cylinders 600 and 700 in a manner such that the rear part of the motor vehicle can be maintained in a more stable state upon high speed traveling of the motor vehicle.

That is to say, the ECU 200 independently controls the deployment of the first and second airflow controlling sections 400a and 400b to which one ends of the first and second pistons 600a and 700a are respectively secured, in a manner such that the rear part of the motor vehicle is prevented from being jolted or lifted upon high speed traveling or abrupt stopping of the motor vehicle. Repeatedly speaking, upon high speed traveling or abrupt stopping of the motor vehicle, the ECU 200 controls the first and second hydraulic cylinders 600 and 700 so as to linearly move upward the first and second pistons 600a and 700a so that the rear part of the motor vehicle is prevented from being jolted or lifted.

Thereby, the first and second airflow controlling sections 400a and 400b to which the one ends of the first and second pistons 600a and 700a are secured and which are connected to the first and second supporting sections 300a and 300b by the hinge shafts 70b, are deployed to predetermined inclination angles with respect to the first and second supporting sections 300a and 300b, in such a way as to prevent the rear part of the motor vehicle from being jolted or lifted.

In other words, in the case that the motor vehicle travels at a low speed, and thereby wind-velocity changes which are sensed at the both sides of the body of the motor vehicle, are flimsy, the ECU 200 linearly moves upward the first and second pistons 600a and 700a of the first and second hydraulic cylinders 600 and 700, so that the first and second airflow controlling sections 400a and 400b are deployed within small inclination angles. On the contrary, in the case that the motor vehicle travels at a high speed, and thereby wind-velocity changes which are sensed at the both sides of the body of the motor vehicle, are substantial, the ECU 200 linearly moves upward the first and second pistons 600a and 700a of the first and second hydraulic cylinders 600 and 700 by a long vertical distance, so that the first and second airflow controlling sections 400a and 400b are deployed within large inclination angles.

At this time, when the airflow which passes over the aerodynamic surfaces of the body of the motor vehicle, including the rear windshield glass 10, collides with the first and second airflow controlling sections 400a and 400b, pressures which are applied to the first and second airflow controlling sections 400a and 400b, vary depending upon inclination angles which are defined by the deployment of the first and second airflow controlling sections 400a and 400b. As a consequence, by virtue of the pressures which are applied to the first and second airflow controlling sections 400a and 400b by the airflow, the rear part of the motor vehicle is prevented from being aerodynamically jolted or lifted due to high speed traveling of the motor vehicle, whereby tire traction and directional stability of the motor vehicle can be remarkably improved.

Here, in the case that wind-velocity changes which are sensed at the both sides of the body of the motor vehicle by the left and right wind-velocity sensing sections 500a and 500b, are different from each other, the ECU 200 independently controls the first and second hydraulic cylinders 600 and 700 depending upon the different wind-velocity changes, so that deployment angles of the first and second airflow controlling sections 400a and 400b are differentiated from each other.

Namely, when a wind-velocity change is large, a deployment angle of the corresponding airflow controlling section 400a or 400b is increased, and, when a wind-velocity change is small, a deployment angle of the corresponding airflow controlling section 400a or 400b is decreased.

On the other hand, when the motor vehicle rounds a sharp curve, wind-velocity changes are differently sensed from each other at the both sides of the body of the motor vehicle. After these wind-velocity changes are sensed by the left and right wind-velocity sensing sections 500a and 500b, they are inputted into the ECU 200.

At this time, the ECU 200 compares with each other and analyses the wind-velocity changes on the both sides of the body of the motor vehicle, which are sensed by the left and right wind-velocity sensing sections 500a and 500b, and then controls operations of the first and second hydraulic cylinders 600 and 700 in a manner such that the rear part of the motor vehicle can be maintained in a more stable state upon high speed traveling of the motor vehicle while being prevented from being aerodynamically jolted or lifted.

That is to say, the ECU 200 independently controls the deployment of the first and second airflow controlling sections 400a and 400b to which one ends of the first and second pistons 600a and 700a are respectively secured, in a manner such that the rear part of the motor vehicle is prevented from being jolted or lifted upon cornering of the motor vehicle. Repeatedly speaking, upon cornering of the motor vehicle, the ECU 200 controls the first and second hydraulic cylinders 600 and 700 so as to linearly move upward the first and second pistons 600a and 700a so that the rear part of the motor vehicle is prevented from being jolted or lifted.

Thereby, the first and second airflow controlling sections 400a and 400b to which the one ends of the first and second pistons 600a and 700a are secured and which are connected to the first and second supporting sections 300a and 300b by the hinge shafts 70b, are deployed to the predetermined inclination angles with respect to the first and second supporting sections 300a and 300b, in such a way as to prevent the rear part of the motor vehicle from being jolted or lifted upon cornering of the motor vehicle, whereby cornering of the motor vehicle can be executed in a more stable manner.

Figure 13:
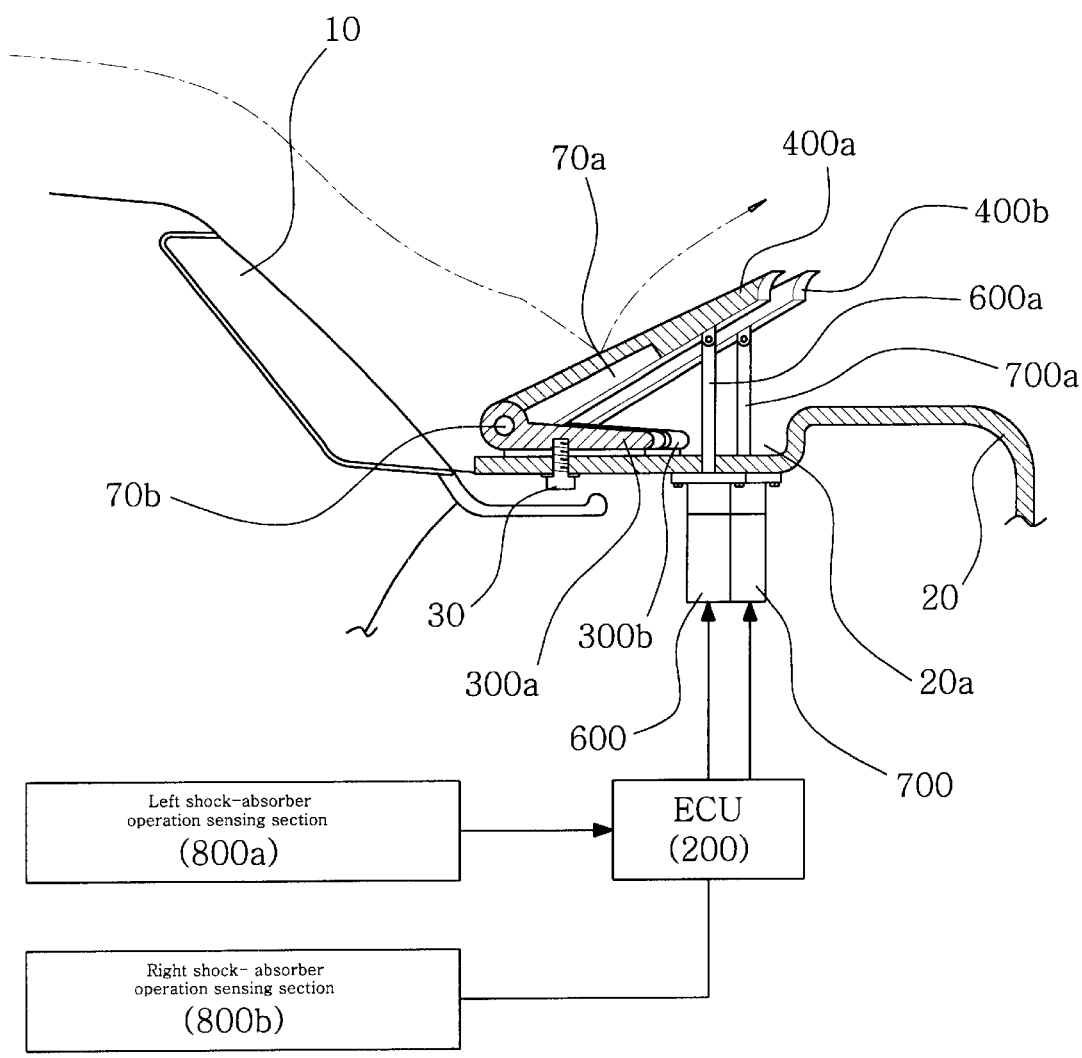
FIG. 13 is a cross-sectional view illustrating a state wherein a plurality of spoilers according to a fourth embodiment of the present invention are mounted to a front end portion of a trunk door of a motor vehicle.

On the other hand, FIG. 13 illustrates a state wherein a plurality of spoilers according to a fourth embodiment of the present invention are mounted to a front end portion of a trunk door of a motor vehicle. In this embodiment, upon cornering of the motor vehicle, operating pressures of shock absorbers (not shown) which are positioned at left and right portions of a rear part of the motor vehicle, are respectively sensed by left and right shock-absorber operation sensing sections 800a and 800b. Then, sensed information is outputted to an ECU 200. Thereafter, the ECU 200 selectively controls deployment of first and second airflow controlling sections 400a and 400b.

Since other component elements of this fourth embodiment of the present invention are structured in the same manner and perform the same functions as those of the third embodiment, descriptions thereof will be omitted herein.

As a result, the traveling safety device for a motor vehicle according to the present invention provides advantages as described below. Since one or more spoilers are disposed between a rear windshield glass and a front end of a trunk door in a manner such that operations of the spoilers can be selectively controlled by signals which are produced by sensing a speed of the motor vehicle through a speedometer, measuring a difference in wind velocity between both sides of a body of the motor vehicle and/or grasping operational statuses of left and right shock absorbers positioned in a rear part of the motor vehicle, upon high speed traveling, abrupt stopping, or cornering of the motor vehicle, and thereby, an end portion or both end portions of the rear part of the motor vehicle can be depressed downward due to collision of airflow which passes over aerodynamic surfaces of the motor vehicle, with the spoilers, the rear part of the motor vehicle is effectively prevented from being jolted or lifted upon high speed traveling, abrupt stopping, or cornering of the motor vehicle, whereby tire traction and directional stability of the motor vehicle is improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A spoiler adapted for controllably diverting airflow which passes over aerodynamic surfaces of a motor vehicle, upon high speed traveling of the motor vehicle, the spoiler comprising:

a supporting section arranged between a rear windshield glass and a trunk door and defined with a receiving groove in a manner such that a front end portion of the trunk door is inserted into the receiving groove, with a rubber packing fitted into the receiving groove, the supporting section being fastened to the front end portion of the trunk door by fastening means; and an airflow controlling section arranged in such a way as to define a predetermined inclination angle with respect to the supporting section, the airflow controlling section functioning to control the airflow which passes over the aerodynamic surfaces of the motor vehicle and thereby forcibly depress downward a rear part of the motor vehicle so that the rear part of the motor vehicle is prevented from being aerodynamically jolted or lifted.

2. A spoiler adapted for controllably diverting airflow which passes over aerodynamic surfaces of a motor vehicle, upon high speed traveling of the motor vehicle, the spoiler comprising:

a supporting section arranged in a recess which is defined on a front end portion of a trunk door, the supporting section being fastened to the front end portion of the trunk door by fastening means;

an airflow controlling section connected to the supporting section by a hinge shaft and defined, adjacent to a proximal end thereof, with a supporting section accommodating groove in which the supporting section can be accommodated, the airflow controlling section being pivoted to a desired inclination angle with respect to the supporting section, in conformity with a traveling speed of the motor vehicle which is sensed by a speedometer and functioning to thereby control the airflow which passes over the aerodynamic surfaces of the motor vehicle so that a rear part of the motor vehicle is prevented from being aerodynamically jolted or lifted; and a hydraulic cylinder having a piston one end of which is secured to a lower surface of the airflow controlling section adjacent to a distal end of the airflow controlling section, the hydraulic cylinder functioning, under control by an electronic control unit and depending upon the traveling speed of the motor vehicle, to linearly reciprocate the piston in upward and downward directions in a manner such that the piston pivots the airflow controlling section to the desired inclination angle.

3. A spoiler adapted for controllably diverting airflow which passes over aerodynamic surfaces of a motor vehicle, upon traveling of the motor vehicle, the spoiler comprising:

first and second supporting sections respectively arranged in recesses which are defined on a front end portion of a trunk door, the first and second supporting sections being fastened to the front end portion of the trunk door by fastening means;

first and second airflow controlling sections connected to the first and second supporting sections by hinge shafts, respectively, and defined, adjacent to proximal ends thereof, with supporting section accommodating grooves, respectively, in which the first and second supporting sections can be accommodated, the first and second airflow controlling sections being pivoted to desired inclination angles with respect to the first and second supporting sections, respectively, upon high speed traveling, abrupt stopping or cornering of the motor vehicle and functioning to thereby control the airflow which passes over the aerodynamic surfaces of the motor vehicle so that a left or right portion or both left and right portions of a rear part of the motor vehicle are prevented from being aerodynamically jolted or lifted;

left and right wind-velocity sensing sections formed at both sides of the rear part of the motor vehicle, respectively, the left and right wind-velocity sensing sections functioning to sense wind velocities on the both sides of the rear part of the motor vehicle upon high speed traveling, abrupt stopping or cornering of the motor vehicle and output sensed information to an electronic control unit; and first and second hydraulic cylinders having first and second pistons which are connected to the first and second airflow controlling sections, the first and second hydraulic cylinders functioning, under control by the electronic control unit and depending upon a difference between the wind velocities which are sensed by the left and right wind-velocity sensing sections, to linearly reciprocate the first and second pistons and thereby pivot the first and second airflow controlling sections to the desired inclination angles, respectively.

4. The spoiler as claimed in claim 3, wherein the first and second airflow controlling sections are pivoted to the desired inclination angles with respect to the first and second supporting sections, respectively, upon cornering of the motor vehicle, in response to operating pressures of shock absorbers positioned at left and right sides of the rear part of the motor vehicle which operating pressures are sensed by left and right shock-absorber operation sensing sections, respectively.

* * * * *